Inventors
Donald W. Siebert
Aaron A. Greenwood
Allan T. Lindquist
by Roberts, Cushman & Woodberry
attys.

April 19, 1938.　　　D. W. SIEBERT ET AL　　　2,114,725
BABY CARRIAGE
Filed Nov. 24, 1936　　　2 Sheets-Sheet 2

Inventors
Donald W. Siebert
Aaron A. Greenwood
Allan T. Lindquist
by Roberts, Cushman & Woodbury
Att'ys.

Patented Apr. 19, 1938

2,114,725

UNITED STATES PATENT OFFICE 2,114,725

BABY CARRIAGE

Donald W. Siebert, Aaron A. Greenwood, and Allan T. Lindquist, Gardner, Mass., assignors to O. W. Siebert Company, Gardner, Mass., a corporation of Massachusetts Application November 24, 1936, Serial No. 112,550

3 Claims. (Cl. 280—36)

This invention relates to baby carriages and the like vehicles having a carriage body supported on a running gear.

The conventional baby carriage usually consists of a rigid carriage body mounted on springs carried by a non-collapsible running gear to which is attached the pushers. As such constructions are quite bulky they take up more space in the modern home than is usually provided and consequently they can not be conveniently stored away when not in use. Manufacturers have attempted to overcome this objection by making carriages with either a collapsible running gear, a collapsible carriage body, or both, as for example in the so-called beach cart. Although these constructions do not require the storage space of a conventional baby carriage, they are nevertheless objectionable not only in appearance because the folding parts are not concealed when set up ready for use, but also due to the fact that it is rather difficult for a woman to set up the collapsed carriage for use and break it down for storage.

The principal objects of the present invention are to overcome the aforementioned objectionable features of prior structures and to provide a carriage which is of simple construction, having but few parts, which is of light weight and of attractive appearance, and which can be partially collapsed so that it may be conveniently stored away, as for example, beneath a table or in a closet where it does not take up substantially more space than that required by a fully collapsible carriage; and to provide a carriage which may be readily and conveniently collapsed and set up for use, and which may be used as a bassinet when in collapsed position.

Further objects will be apparent from a consideration of the following description and accompanying drawings, wherein.

Figure 1:
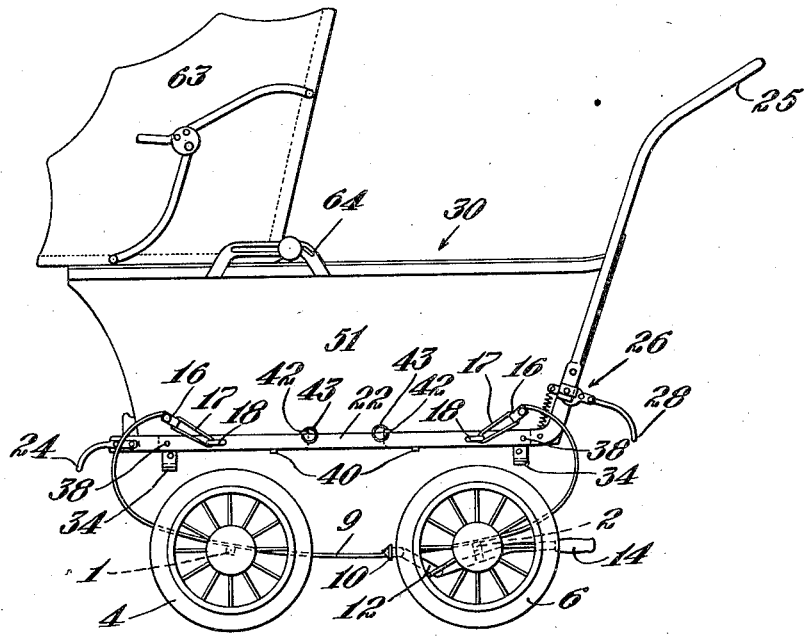
Fig. 1 is a side elevation of a baby carriage constructed in accordance with the present invention, the carriage body being shown in erected position.

In the embodiment herein shown for the purpose of illustration the running gear includes front and rear axles 1 and 2 and a pair of longitudinally extending extending members 8 and 9 (Fig. 3) which are riveted or otherwise secured to the axles 1 and 2 so as to provide a rigid frame or chassis. Wheels 3, 4, 5 and 6 are rotatably mounted on axles 1 and 2, and a flexible brake bar 10 is pivotally mounted adjacent to each end of the members 8 and 9 so that its ends move toward and away from the rear wheels 5 and 6 in response to the flexing of its central portion. The brake bar 10 carries a lug 11 connected by a link 12 to the brake lever 14, the link 12 and brake lever 14 constituting, in effect, toggle links which are effective to hold the brake bar 10 flexed when the brake lever 14 is depressed, as shown in Fig. 2. When the parts are in normal position, as shown in Figs. 1 and 3, the ends of the brake bar 10 are held spaced from the wheels 5 and 6, but when the brake lever 14 is depressed, as above described, the ends of the brake bar hold the wheels 5 and 6 locked against rotation.

Figure 2:
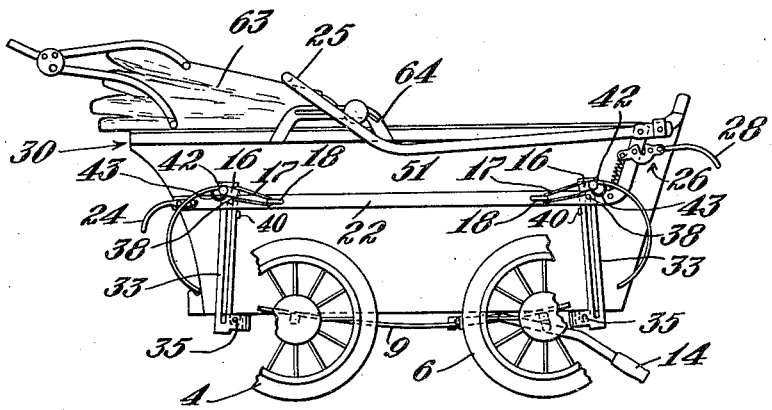
Fig. 2 is a side elevation, with parts broken away, showing the carriage body in collapsed or lower position.
Figure 3:
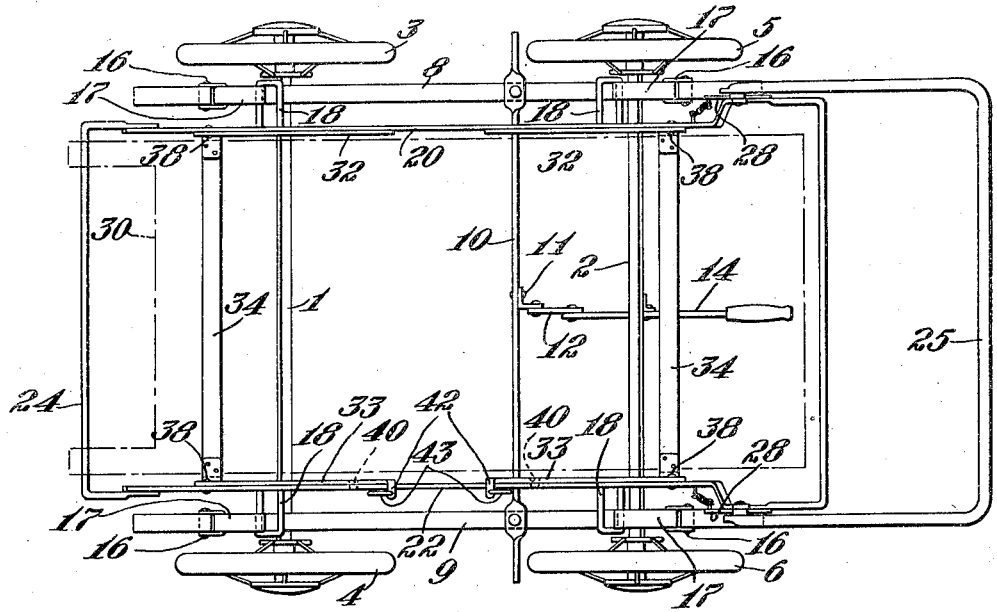
Fig. 3 is a plan view of the running gear, supporting structure and associated parts.

The end of each member is preferably resilient and curves upwardly and inwardly, as shown in Figs. 1 and 2, and each end is provided with a shackle 16 which carries a strap or flexible link 17. Each of the links 17, associated with the member 8, is connected to one of a pair of spaced staples 18 integrally joined to a longitudinally extending frame member 20 disposed inwardly of the member 8, and the corresponding links 17, associated with the member 9, are likewise connected to staples 18 integrally joined to a corresponding longitudinally extending frame member 22, as shown in Figs. 1 to 3.

The front ends of the frame members 20 and 22 are connected by a crossbar 24, and the opposite ends of these members are formed with upwardly curved extensions which pivotally support the legs of a U-shaped pusher 25 and also latch devices designated by the numeral 26, these latch devices being operative to lock the pusher 25 in erected position, as shown in Fig. 1. In order to effect the simultaneous release of the latch devices, their respective operating levers are connected to a transversely extending release bar 28. When the pusher 25 is in erected position (Figs. 1 and 3) it may be swung to folded or collapsed position (Fig. 2) simply by depressing the release bar 28 and swinging it inwardly.

A carriage body, designated by the numeral 30, is disposed between the frame members 20 and 22 with its side walls in spaced relation thereto, so as to permit a substantially vertical movement toward and away from the running gear. The carriage body is supported at each end by a substantially U-shaped member which comprises slotted legs 32 and 33, constituting pivotal links, and a closed end or connecting link 34 which extends across the bottom of the carriage body. The lower end of each of the links 32 and 33 are pivotally connected to the bottom wall or lower edge of the carriage body, as shown at 35 in Fig. 2, so that when one of the links is swung in one direction or the other, the companion link on the opposite side of the carriage body is swung correspondingly.

Each of the frame members 20 and 22 is provided with an inwardly extending guide pin 38 located adjacent to the ends of the frame member and these guide pins project into slots in the links 32 and 33 to provide a guiding means and also a pivot about which the links may be swung when in elevated position. Corresponding links at each end of the members 20 and 22, here shown as the links 33, are provided with outwardly extending lugs or catches 40 arranged to engage the lower edge of the adjacent frame member, thereby to hold the links in concealed horizontal position when the carriage is in erected position. In order to provide a convenient means for manipulating the links 32 and 33 to raise and lower the carriage body 30, the links 33 are provided with outwardly projecting lugs 42, each of which carries a grip ring 43. If desired, the links 32 may also be provided with same or similar elements, although only one set, as herein shown, is necessary.

Figure 4:
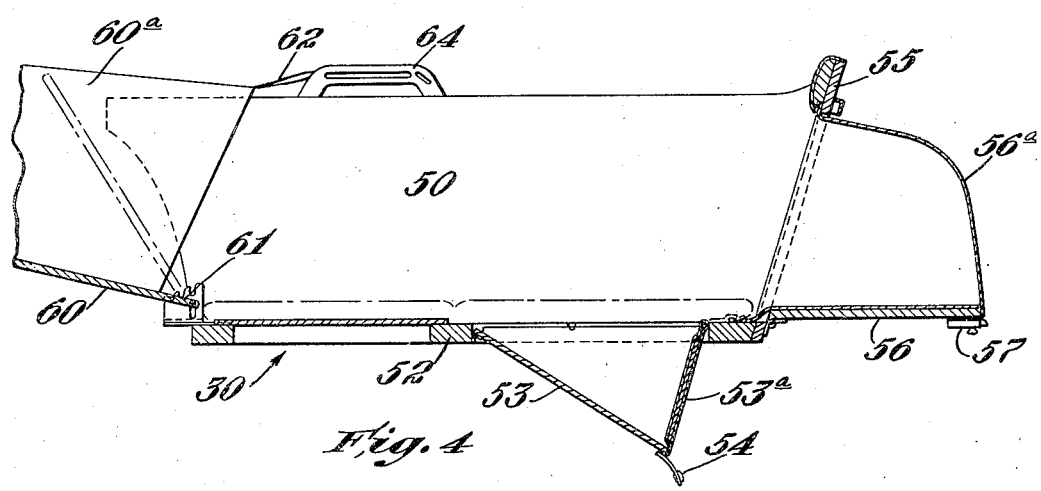
Fig. 4 is a longitudinal section through the carriage body.

Although the carriage body 30 may be of any desired design or construction, it is herein shown by way of illustration (Fig. 4) as having side walls 50 and 51 rigidly mounted on a bottom wall 52, the front part of which is provided with a drop section 53 adapted to be releasably locked or held in closed position by a snap fastener 54 or other suitable means. The end wall 55 is formed with the collapsible section or drop wall 56 which carries a spring-pressed latch 57 by means of which it may be releasably held in closed position, and the front end 60 is pivotally mounted, as indicated at 61, so that it may be swung from an upright to a horizontal position in substantially the same manner as the rear wall 55, thus providing a structure whose effective length or capacity may be increased. The bottom section 53 and the end walls 56 and 60 are provided with foldable flaps 53a, 56a and 60a, respectively, which constitute closures when the bottom section and end walls are extended, as shown in Fig. 4. The flaps 60a are provided with a tie cord or ribbon 62 by means of which the flaps 60a may be secured to the adjacent side walls of the carriage body when the wall 60 is in a lowered position. The carriage body is also provided with the usual hood 63 adjustably mounted on brackets 64 carried by the side walls 50 and 51.

When the carriage body 30 is in collapsed or lowered position (Fig. 2) it may be supported on the axles 1 and 2 and the links 32 and 33 are held in substantially vertical position by the pivotal connections 35 and guide pins 38. When the hood 62 is collapsed, the pushers 25 swung upwardly and with the carriage body in lowered position, as shown in Fig. 2, the entire carriage may be rolled beneath a table or into a closet, or otherwise stored away, it being noted that the structure when thus collapsed, does not require substantially more storage space than it would if the running gear and body were foldable. It will be further noted that with the parts in this same position, the pillows, covers, etc. may be neatly stored within the carriage body where they are always available when the carriage is to be used.

If desired, the carriage body may be collapsed, as shown in Fig. 2, but with the pusher 25 in upright position, and with the hood either in erected or collapsed position, the carriage may be used as a bassinet.

To set up the carriage for regular use, it is merely necessary either to lift the carriage body upwardly or by means of the grip rings 43 the links 32 and 33 may be pulled upwardly, thus lifting one end of the carriage body, and by swinging the link 33 downwardly to the position shown in Fig. 1, both links 32 and 33 may be locked in horizontal position by the engagement of the catch 40 against the adjacent frame member, in which position one end of the carriage body is securely supported in elevated position. In like manner the links 33 at the other end of the frame member 22 may be manipulated to elevate the opposite end of the carriage body and lock it in elevated position. In order to lower the carriage body the links 33 are first flexed inwardly so that the catches 40 are clear of the adjacent frame members and the links 33 are then swung upwardly, thus permitting the carriage body to drop or slide downwardly from the position shown in Fig. 1 to the position shown in Fig. 2.

It is apparent from the foregoing that a carriage constructed in accordance with the present invention may be quickly set up and collapsed by two simple manipulations which require but a few seconds and the exertion of little effort. It will be noted that the carriage body when in erected position is quite stable, free from danger of accidental collapsing, and not only possesses all the advantageous features of the conventional non-collapsible type of carriage, but also is of light weight and as the operating mechanism (links 32, 33 and associated parts) is effectively concealed, the carriage when set up presents a more attractive appearance than would otherwise be possible.

While we have shown and described one desirable embodiment of the present invention, it is understood that this disclosure is for the purpose of illustration, and that various changes in shape, proportion and arrangement of parts, as well as the substitution of equivalent elements for those herein shown and described, may be made without departing from the spirit and scope of the invention as set forth in the appended claims.

We claim:

1. A carriage comprising a running gear having spaced upstanding members, spaced frame members carried by the upper ends of said upstanding members, a carriage body disposed between said frame members, slotted links carried by said frame members, laterally extending pins carried by said frame members and projecting into the slots in said links, one end of said links engaging said carriage body so as to hold it in elevated position when said links are in a substantially horizontal position and to permit said carriage body to be lowered when said links are moved to a substantially vertical position, and means for holding said links in a substantially horizontal position to maintain said body in elevated position.

2. A carriage comprising a running gear having spaced upstanding members, spaced frame members carried by the upper ends of said upstanding members, a carriage body disposed between said frame members, spaced U-shaped members having closed ends extending across the bottom of said carriage body to provide supporting yokes, means for supporting said yokes for vertical movement toward and away from said running gear, and releasable means for locking said yokes in elevated position, thereby to maintain said body in elevated position.

3. A carriage comprising a running gear having upwardly extending spaced members, a carriage body disposed between said members and normally supported at a level substantially above the axles of said running gear, and links pivotally secured to said carriage body, said links having pin and slot connections with said members constructed and arranged to be effective when swung to substantially vertical position to lower said carriage body to a substantially lower lever and being substantially concealed between said carriage body and members when said carriage body is in elevated position.

DONALD W. SIEBERT.
AARON A. GREENWOOD.
ALLAN T. LINDQUIST.